United States Patent Office 3,472,264
Patented Oct. 14, 1969

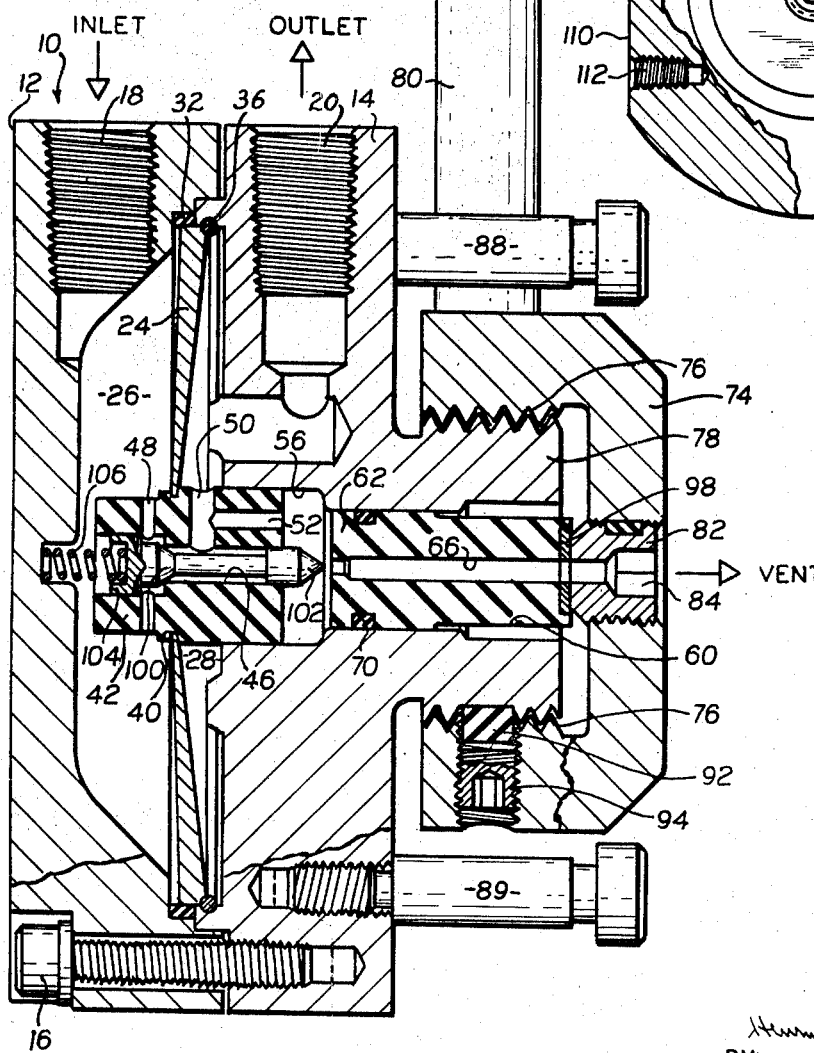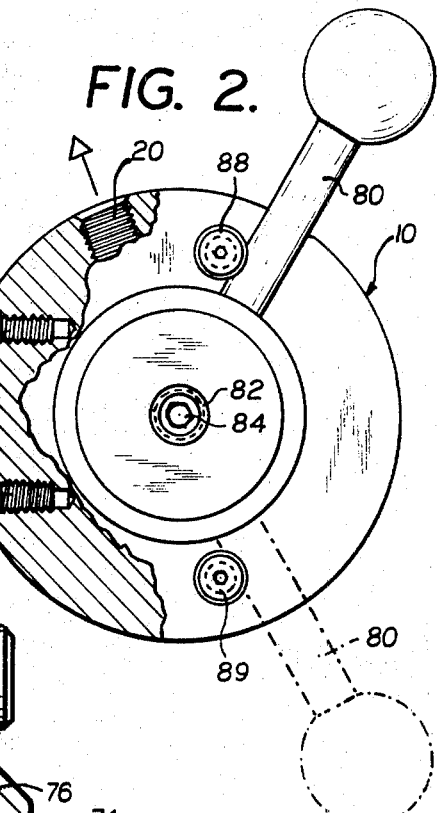

3,472,264
FLUID PRESSURE CONTROLLER WITH ADJUSTING MEANS
Henry Alfred Petry, Sparta, N.J., assignor to Marotta Valve Corporation, Boonton, N.J., a corporation of New Jersey
Filed Mar. 3, 1967, Ser. No. 620,500
Int. Cl. G05b *16/04*
U.S. Cl. 137—116.5    12 Claims

ABSTRACT OF THE DISCLOSURE

This disclosure describes a pressure reducing apparatus that receives fluid at one pressure and delivers it at a lower pressure which is always less than the supply pressure by the same amount. For example, the delivery pressure may be ten pounds per square inch less than the supply pressure, and when the supply pressure fluctuates, the delivery pressure fluctuates by the same amount. The apparatus has a handle that can be moved to different positions to change the pressure difference between supply pressure and delivery pressure. If at any time the delivery pressure is not less than the supply pressure by the amount for which the apparatus is adjusted, the excess pressure escapes through a pressure relief valve.

Brief description of the invention

It is an object of this invention to provide an improved pressure reducing valve having a predetermined differential between the supply pressure and the delivery pressure. The two pressures fluctuate together, but the delivery pressure stays below the supply pressure by a preset amount at all times.

The invention has a relief valve for venting pressure on the delivery side of the pressure reducer if the delivery pressure is greater than the proper amount, as determined by the preset differential, below the supply pressure.

There is an adjustment for changing the amount that the invention reduces the pressure; and the relief valve setting changes automatically with the pressure reduction adjustment so that the relief valve operates at a different pressure which is a function of the pressure difference between supply and delivery pressures. The relief valve opens whenever the delivery pressure comes closer than a predetermined value to the supply pressure.

In the preferred embodiment of the invention, the differential pressure control valve and the relief valve are different parts of the same valve element, and it is the contact of the relief valve with its seat, while the seat of the differential pressure control valve continues to move, that causes opening of the differential pressure control valve. Movement of the relief valve seat changes the amount of pressure reduction of the apparatus and at the same time adjusts the pressure relief valve for a new pressure difference.

The invention provides a simple and rugged structure for obtaining the results described. Other objects, features and advantages of the invention will appear or be pointed out as the description proceeds.

Brief description of the drawing

In the drawing, forming a part hereof, in which like reference characters indicate corresponding parts in all the views;

FIGURE 1 is a sectional view through pressure reducing apparatus made in accordance with this invention; and FIGURE 2 is a side elevation, on a reduced scale, partly broken away, of the apparatus shown in FIGURE 1.

Detailed description of the invention

The apparatus shown in FIGURE 1 includes a housing 10 which is made in two sections, including a front section 12 and a back section 14. These two sections are connected together by a circle of screws 16. There is an inlet port 18 in the front section 12, and there is a delivery port 20 in the back section 14.

The housing encloses a chamber which is divided by a movable wall 24 into an upstream chamber 26 and a downstream chamber 28. In the construction illustrated, the movable wall 24 is a flexible diaphragm, and more specifically a dished spring washer of a tapered radial cross-section, the section becoming thicker toward the outside circumference of the washer.

There is a static body sealing ring 32 clamped between the front section 12 and the back section 14. The circumference of the diaphragm washer 24 touches this sealing ring 32, but the diaphragm washer is sealed against leakage of fluid from the upstream chamber 26 to the downstream chamber 28 by a sealing ring 36 which is preferably an O-ring located in a circumferential groove in a wall of the downstream chamber 28. A sloping face of the diaphragm washer 24, around the circumference of the washer 24, contacts with the sealing ring 36.

There is an opening through the center of the diaphragm washer 24, the edge of this opening being designated by the reference character 40. Valve means for controlling the flow of fluid from the upstream chamber 26 to the downstream chamber 28 includes a seat element 42 which is operably connected with the inner edge 40 of the diaphragm washer 24 so that the seat element 42 moves axially with the center portion of the diaphragm washer 24. This seat element 42 is preferably made of plastic material capable of withstanding extremely low temperatures without becoming brittle.

A guide opening 46 extends through the seat element 42 along the longitudinal axis thereof, and this guide opening 46 communicates with the upstream chamber 26 through radial openings 48 in the seat element 42. There is an opening 50 in the seat element through which the guide opening 46 communicates with the downstream chamber 28 and another opening 52 puts the opening 28 in communication with a counterbore 56 in which the seat element 42 slides as a piston.

The housing 10 has a vent passage 60 of which the counterbore 56 constitutes a part. There is a vent passage seat 62 which fills the full diameter of the vent passage 60 beyond the counterbore 56, but which has a longitudinal opening 66 so that the vent passage 60 is not fully obstructed by the seat 62. An O-ring 70 in a circumferential groove in the outside of the seat 62 seals the seat 62 against the escape of fluid through the running clearance between the seat 62 and the wall of the vent passage 60 in which the seat 62 is axially movable.

Means are provided for adjusting the position of the seat 62 in the vent passage 60. These means include a device on the outside of the housing comprising a nut 74 which fits over threads 76 on a hub 78 of the housing. There is a handle 80 attached to the nut 74 for rotating the nut on the threads 76.

A bushing 82 is secured to the center portion of the nut 74 and this bushing 82 has a center opening 84 which is a part of the vent opening from the housing 10. The bushing 82 is integrally connected to the nut 74 and rotates as a unit therewith.

The extent to which the nut 74 can be rotated is limited by stops 88 and 89 which are threaded into the back wall of the back section 14 of the housing. These stops 88 and 89 extend into the path of the handle 80 and limit the angle through which the handle 80 can swing.

In order to make the handle 80 remain in any position to which it is adjusted, there are means for regulating the friction of the nut 74 on the threads 76. This means includes a plastic block 92 which is clamped against the threads 76 by a set screw 94 threaded into an opening in the nut 74.

The plug which constitutes the plastic seat 62 has a metal washer 98 embedded in its rearward face for contact with the end face of the bushing 82 so that movement of the bushing 82 does not cause excessive wear of the end face of the valve seat 62. The adjustment of the valve seat 62 toward the left in FIGURE 1 is effected by turning the handle 80 and nut 74 in a direction to sift the bushing 82 toward the left and thus to displace the valve seat 62 by positive displacement. When the valve seat 62 is to be moved toward the right, however, the handle 80 and nut 74 are moved in a direction to back the bushing 82 away from the vent passage valve seat 62, but there is no connection for making the vent passage valve seat 62 move to the right with the bushing 82. However pressure of fluid in the downstream chamber 28 is transmitted through the passages 50 and 52 into the counterbore 56 where it exerts sufficient force against the vent passage valve seat 62 to hold this valve seat 62 in contact with the bushing 82.

There is a valve element 100 which contacts with the valve seat 42 to shut off the flow of fluid from the upstream chamber 26 to the downstream chamber 28. There is a relief valve element 102 which contacts with the vent passage valve seat 62 to stop flow of fluid from counterbore 56 through the vent opening 66 and outlet 84. In the construction illustrated, the valve elements 100 and 102 are formed on opposite ends of a common stem so that they are of one piece construction with one another and move as a unit. These valve elements 100 and 102 are held in alignment with their seats by a portion of the valve element 102 which slides in the guide opening 46 as a guide and by a piston 104 which slides in a guide in the other end of the seat element 42. This piston 104 has a pointed end which projects into a complementary socket in the valve element 100, and the pointed end of the piston 104 is held in constant contact with the socket of the valve element 100 by a coil spring 106 compressed between the piston 104 and the wall of the front section 12 of the housing. The diaphragm washer 24 is made of spring material and has a bias which urges the seat element 42 to move toward the left in FIGURE 1; and the spring 106 urges the valve element 100 into contact with its seat and by pressure against the seat element 42 to move toward the right in FIGURE 1 until the relief valve element 102 comes in contact with the vent passage seat element 62.

If the pressure in the donwstream chamber 28 is equal to the pressure in the upstream chamber 26, then the spring 106 cannot overcome the spring force of the diaphragm washer 24 and cannot push the seat element 42 far enough to close the relief valve element 102. Thus fluid in the donwstream chamber 28 escapes through the opening 66 in the vent passage seat 62 and through the opening 84 in the bushing 82 until the pressure in the downstream chamber 28 drops to a level substantially less than that in the upstream chamber 26. When the pressure in the downstream chamber 28 is less than that in the upstream chamber 26 by a given amount, the amount being dependent upon the adjustment axially of the vent passage seat 62, the spring 106 combined with the differential pressure on the left hand side of the diaphragm washer 24 will close the relief valve element 102. As the pressure in the donwstream chamber 28 continues to decrease as the result of flow of fluid from the delivery port 20, the differential pressure across the diaphragm washer 24, combined with the force of the spring 106, moves the seat element 102 into contact with its seat, the valve element 100 cannot move toward the right with the seat element 42 and the seat element moves away from the valve element 100 leaving a clearance for flow of fluid from the upstream chamber 26 to the downstream chamber 28. Pressure in the downstream chamber builds up until a state of equilibrium is again reached where the seat element 42 moves sufficiently to the left to again contact the valve element 100 and shut off further flow of fluid through the opening at the center of the diaphragm washer.

FIGURE 2 shows a side elevation of the apparatus shown in FIGURE 1 and illustrates the angular movement of the handle 80 for adjusting the pressure at which the apparatus operates. FIGURE 2 also shows a flat face 110 on the side of the housing away from the handle 80 and there are threaded screw openings 112 in the face 110 for receiving screws to connect the housing to a bracket, bulk head or other support.

The preferred embodiment of the invention has been illustrated and described, but changes and modifications can be made, and some features can be used in different combinations without departing from the invention as defined in the claims.

What is claimed is:

1. A pressure-reducing valve including a housing having a supply port and a delivery port, a movable wall dividing the interior of the housing into two chambers, including an upstream chamber to which fluid flows through the supply port and a downstream chamber from which fluid flows through the delivery port, the movable wall having an opening therein for passage of fluid from the upstream chamber to the downstream chamber, and valve means controlling passage of fluid through said opening, the valve means including a valve element and a seat element, one of which is movable with the wall and the other of which is relatively fixed, a guide on the wall of one of said chambers in which one element of the valve means is axially slidable, another guide in the seat element, a bearing surface on the valve element that fits into the other guide and that has axial movement relative to the other guide, the valve means being oriented so that movement of the wall toward the downstream chamber opens a clearance between the valve element and the seat element and results in fluid flow through said opening in the wall, the movable wall being biased toward the upstream chamber whereby a given pressure differential on the opposite sides of the wall is necessary to permit the supply pressure to move the wall into position to open a clearance between the valve means and the seat means.

2. The pressure-reducing valve described in claim 1 characterized by a vent passage opening from the downstream chamber through a side of the housing, a relief valve element commanding the vent passage, the relief valve element being connected with said valve means and being moved into open position when said valve means is in its closed position and the movable wall is then moved further toward the upstream chamber by pressure in the downstream chamber.

3. The pressure-reducing valve described in claim 2 characterized by the relief valve being connected directly to the valve element that controls the passage of fluid through the opening in he movable wall and being movable with it as a unit.

4. The pressure-reducing valve described in claim 2 characterized by a seat in the vent passage and with which the relief valve element contacts when in closed position, and means adjusting the position of the seat in the direction in which the relief valve element moves to change the location at which the relief valve element contacts with the seat and the resulting pressure differential at which the relief valve element opens the vent passage.

5. The pressure-reducing valve described in claim 4 characterized by the means for adjusting the position of the seat element being a device with screw threads about an axis extending in the same direction as the axis of movement of the seat, a handle connected with said device and located outside of the housing, the handle being movable angularly to screw said device along its threads.

6. The pressure-reducing valve described in claim 5 characterized by stops on the outside of the housing in the path of movement of the handle for limiting the angle of movement thereof, and adjustable means for regulating friction of the movable parts that adjust the seat to prevent change of adjustment as a result of vibration.

7. The pressure-reducing valve described in claim 1 characterized by relief valve means for venting the downstream chamber, said relief valve means being constructed and arranged to be operated by a drop in the pressure differential on the opposite sides of the movable wall below a given value.

8. The pressure-reducing valve described in claim 7 characterized by means for adjusting the relief valve means to open at different values of the pressure differential on opposite sides of the movable wall.

9. The pressure-reducing valve described in claim 1 characterized by the movable wall being a flexible diaphragm and the valve seat being movable by and with the flexible diaphragm, the valve seat having guide means for the valve element, and the valve element being movable in said guide means into and out of closed position with respect to said seat.

10. The pressure-reducing valve described in claim 9 characterized by the flexible diaphragm being a spring washer that urges the valve seat toward the upstream chamber, and spring means that urge the valve element into contact with the seat and that urge both the valve element and the seat toward the downstream chamber.

11. The pressure-reducing valve described in claim 10 characterized by the spring washer having a radial taper to greater thickness toward its circumference, a sealing ring at the circumference of the washer, a shoulder on the inside wall of the housing, and with which the sealing ring is in contact to hold the sealing ring against displacement, the guide in a wall being in the downstream chamber, the seat element being operably connected with the washer around the inside edge of the washer, and a portion of the seat element being axially slidable in the guide in the wall of the downstream chamber, and a spring compressed between the valve element and a wall of the upstream chamber.

12. The pressure-reducing valve described in claim 11 characterized by a vent passage opening from the downstream chamber through a side of the housing, the guide for the seat element being in axial alignment with the vent passage, a relief valve seat element in the vent passage, means for adjusting the relief valve seat element axially in the vent passage, and a relief valve element that is formed on the end of the first valve element at the end remote from said spring and in position to contact with the relief valve seat element to close the vent passage.

References Cited
UNITED STATES PATENTS

| | | | |
|---|---|---|---|
| 354,017 | 12/1886 | Helm | 251—64 XR |
| 668,557 | 2/1901 | Englen | 251—288 |
| 1,493,774 | 5/1924 | Dorsey | 137—510 XR |
| 1,826,597 | 10/1931 | Brecht. | |
| 2,207,382 | 7/1940 | McNamara | 137—508 XR |
| 2,655,935 | 10/1953 | Kinzbach | 137—538 |
| 3,288,165 | 11/1966 | Crange | 137—510 XR |

HAROLD W. WEAKLEY, Primary Examiner

U.S. Cl. X.R.

137—494, 508, 510; 251—297